(No Model.)
J. B. PHILLIPY & S. P. DEALY.
DOMESTIC BOILER.
No. 412,662. Patented Oct. 8, 1889.
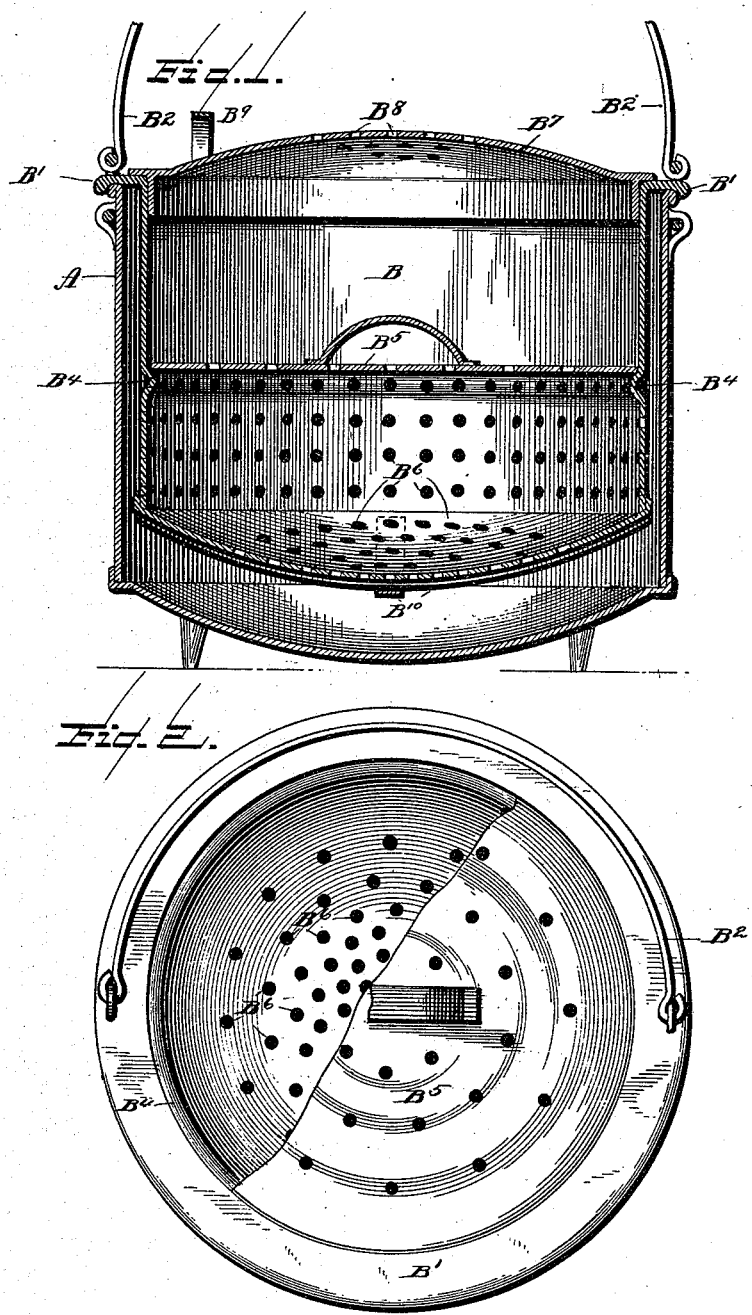

UNITED STATES PATENT OFFICE.

JOHN B. PHILLIPY AND SIMON P. DEALY, OF HARTSVILLE, INDIANA.

DOMESTIC BOILER.

SPECIFICATION forming part of Letters Patent No. 412,662, dated October 8, 1889.

Application filed February 6, 1888. Serial No. 263,108. (No model.)

*To all whom it may concern:*

Be it known that we, JOHN B. PHILLIPY and SIMON P. DEALY, citizens of the United States, residing at Hartsville, in the county of Bartholomew, State of Indiana, have invented certain new and useful Improvements in Domestic Boilers, of which the following is a specification, reference being had therein to the accompanying drawings.

This invention has relation to domestic boilers, and has for its object the provision of a steaming-cylinder adapted to be suspended within an ordinary kettle containing water, whereby steam generated within the kettle passes up through the steamer and vegetables or other articles contained therein.

Other objects and advantages of the invention will hereinafter appear, and the novel features will be particularly pointed out in the claim.

Referring to the drawings, Figure 1 is a vertical central section of a kettle provided with a steamer constructed in accordance with our invention, and Fig. 2 is a plan, a portion of the cover being broken away, exposing the interior.

Like letters of reference indicate like parts in all the figures of the drawings.

A represents the kettle, which is of the usual construction, and B represents the steaming-cylinder, which is suspended in position within the kettle by means of an outwardly-extending annular flange B', adapted to be seated upon the edge of the kettle. The steaming-cylinder B is provided with a lifting-bail or handle $B^2$, by which it may be removed from the kettle or placed therein. About midway the cylinder B is formed an inwardly-disposed annular bead $B^4$, adapted to receive a perforated cover $B^5$. The bottom of the cylinder and also that portion below the annular bead $B^4$ is perforated, as at $B^6$, so as to allow a free admission of steam therein. Re-enforcing strips $B^{10}$ are secured to the bottom of the steamer and serve to strengthen the same. A second or outer cover $B^7$ is fitted to the upper end of the cylinder B, which cover is perforated, as at $B^8$, to permit of the escape of steam generated within the kettle, and with a handle $B^9$, located at one side, to prevent burning the hand. There are preferably a less number of perforations in the outer cover $B^7$ than in the internal cover $B^5$, so that the steam is retained a longer time within the kettle and steamer and within the steam-space formed by the two covers. This steam-space is of course differentiated from that below the cover $B^5$ by the fact of the less number of holes by which the steam enters therein, and also by the fact of its greater removal from the water below. This fact causes a different quality of steam in these two compartments, and by the proper choice of positions for use with different edibles the very best results may be obtained, and, in fact, two kinds of food may be cooked at once in their appropriate compartments without difficulty and without affecting each other's flavor. By this construction vegetables or other edibles placed within the steaming-cylinder are exposed only to the action of the steam and do not come in contact with the boiling water.

Having described our invention and its operation, what we claim is—

A domestic boiler consisting of the outer imperforate vessel A, the inner vessel B, having the re-enforced perforated bottom, the perforated body provided with the internally-projecting apertured bead $B^4$ and upper flange B', the apertured cover $B^5$, and the apertured externally-flanged cover $B^7$, substantially as specified.

In testimony whereof we affix our signatures in presence of two witnesses.

JOHN B. PHILLIPY.
SIMON P. DEALY.

Witnesses:
ANDERSON GRIFFEY,
EDWARD WHALEN.